US012111837B1

(12) United States Patent
Jiao et al.

(10) Patent No.: US 12,111,837 B1
(45) Date of Patent: Oct. 8, 2024

(54) DENSE RETRIEVAL EMPLOYING PROGRESSIVE DISTILLATION TRAINING

(71) Applicant: Microsoft Technology Licensing, LLC, Redmond, WA (US)

(72) Inventors: Jian Jiao, Bellevue, WA (US); Yeyun Gong, Beijing (CN); Xingwei He, Beijing (CN); Nan Duan, Beijing (CN); Eren Manavoglu, Menlo Park, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/306,869

(22) Filed: Apr. 25, 2023

(51) Int. Cl.
 *G06F 16/2457* (2019.01)
 *G06F 16/242* (2019.01)
 *G06F 16/248* (2019.01)
 *G06N 20/00* (2019.01)

(52) U.S. Cl.
 CPC .... *G06F 16/24578* (2019.01); *G06F 16/2438* (2019.01); *G06F 16/248* (2019.01); *G06N 20/00* (2019.01)

(58) Field of Classification Search
 CPC ........... G06F 16/24578; G06F 16/2438; G06F 16/248
 See application file for complete search history.

(56) References Cited

U.S. PATENT DOCUMENTS

2018/0341871 A1* 11/2018 Maitra ................ G06N 3/042
2021/0374168 A1* 12/2021 Srinivasan ............ G06V 10/82

FOREIGN PATENT DOCUMENTS

CN     110888970 A     3/2020
EP     3970031 A1      3/2022

OTHER PUBLICATIONS

"CommonGen: A Constrained Text Generation Challenge Towards Generative Commonsense Reasoning", Retrieved from: https://github.com/INK-USC/CommonGen, Dec. 9, 2021, 3 Pages.
Allot, et al., "LitSense: making sense of biomedical literature at sentence level", in Journal of Nucleic Acids Research, vol. 47, Issue W1, Jul. 2, 2019, 6 Pages.
(Continued)

*Primary Examiner* — Baoquoc N To
(74) *Attorney, Agent, or Firm* — CALFEE, HALTER & GRISWOLD LLP

(57) ABSTRACT

Technologies described herein relate to dense retrieval and ranking of search results. A query indicating a computing context or user input is received. An embedding of the query is computed by way of a first encoder, and candidate results selected from a pool of potential results based upon the embedding of the query and embeddings of the potential results. A similarity score for a first of the candidate results is computed by way of a second encoder trained based upon an order metric that defines a ranking over a training set of potential results. The first encoder is trained based upon output of the second encoder prior to computing the embedding of the query. The candidate results are ranked based upon the similarity score of the first candidate result, and results responsive to the query are identified based upon the ranking. The identified results are output to a computing device.

20 Claims, 6 Drawing Sheets

(56) References Cited

OTHER PUBLICATIONS

Anderson, et al., "SPICE: Semantic Propositional Image Caption Evaluation", in Proceedings of European Conference on Computer Vision, Sep. 16, 2016, pp. 382-398.
Banerjee, et al., "METEOR: An Automatic Metric for MT Evaluation with Improved Correlation with Human Judgments", in Proceedings of the ACL Workshop on Intrinsic and Extrinsic Evaluation Measures for Machine Translation and/or Summarization, Jun. 29, 2005, pp. 65-72.
Bao, et al., "UniLMv2: Pseudo-Masked Language Models for Unified Language Model Pre-Training", in Proceedings of the 37th International Conference on Machine Learning, Nov. 21, 2020, 11 Pages.
Bowman, et al., "A Large Annotated Corpus for Learning Natural Language Inference", in Proceedings of the 2015 Conference on Empirical Methods in Natural Language Processing, Sep. 17, 2015, pp. 632-642.
Chen, et al., "A Simple Framework for Contrastive Learning of Visual Representations", in Proceedings of the 37th International Conference on Machine Learning, Jul. 13, 2020, 11 Pages.
Dong, et al., "Unified Language Model Pre-training for Natural Language Understanding and Generation", in Proceedings of 33rd Conference on Neural Information Processing Systems, Dec. 8, 2019, 13 Pages.
Fan, et al., "An Enhanced Knowledge Injection Model for Commonsense Generation", in Proceedings of the 28th International Conference on Computational Linguistics, Dec. 8, 2020, pp. 2014-2025.
Ippolito, et al., "Comparison of Diverse Decoding Methods from Conditional Language Models", in Repository of arXiv:1906.06362v1, Jun. 14, 2019, 11 Pages.
Johnson, et al., "Billion-Scale Similarity Search with GPUs", in Journal of IEEE Transactions on Big Data, vol. 7, Issue 3, Jun. 10, 2019, pp. 535-547.
Karpukhin, et al., "Dense Passage Retrieval for Open-Domain Question Answering", in Proceedings of the Conference on Empirical Methods in Natural Language Processing, Nov. 16, 2020, pp. 6769-6781.
Kingma, et al., "Adam: A Method for Stochastic Optimization", in Proceedings of the International Conference on Learning Representations, May 7, 2015, 13 Pages.
Krishna, et al., "Dense-Captioning Events in Videos", in Proceedings of IEEE International Conference on Computer Vision, Oct. 22, 2017, pp. 706-715.
Lewis, et al., "BART: Denoising Sequence-to-Sequence Pre-training for Natural Language Generation, Translation, and Comprehension", in Proceedings of the 58th Annual Meeting of the Association for Computational Linguistics, Jul. 5, 2020, pp. 7871-7880.
Li, et al., "KFCNet: Knowledge Filtering and Contrastive Learning Network for Generative Commonsense Reasoning", in Proceedings of Findings of the Association for Computational Linguistics, Nov. 7, 2021, pp. 2918-2928.
Lin, et al., "CommonGen: A Constrained Text Generation Challenge for Generative Commonsense Reasoning", in Proceedings of Findings of the Association for Computational Linguistics, Nov. 16, 2020, pp. 1823-1840.
Lin, Chin-Yew, "ROUGE: A Package for Automatic Evaluation of Summaries", in Journal of Association for Computational Linguistics, Jul. 2004, 8 Pages.
Liu, et al., "KG-BART: Knowledge Graph-Augmented BART for Generative Commonsense Reasoning", in Proceedings of the AAAI Conference on Artificial Intelligence, May 18, 2021, 9 Pages.
Liu, et al., "KGR4: Retrieval, Retrospect, Refine and Rethink for Commonsense Generation", in Proceedings of the AAAI Conference on Artificial Intelligence, vol. 36, Issue 10, Jun. 28, 2022, 9 Pages.
Papineni, et al., "BLEU: A Method for Automatic Evaluation of Machine Translation", in Proceedings of 40th Annual Meeting on Association for Computational Linguistics, Jul. 6, 2002, pp. 311-318.
Radford, et al., "Language Models are Unsupervised Multitask Learners", in Journal of OpenAI Blog, vol. 1, Issue 8, Feb. 24, 2019, 24 Pages.
Raffel, et al., "Exploring the Limits of Transfer Learning with a Unified Text-to-Text Transformer", in Journal of Machine Learning Research, vol. 21, Issue 140, Jun. 2020, 67 Pages.
Sarwar, et al., "Sentence Retrieval for Entity List Extraction with a Seed, Context, and Topic", in Proceedings of the ACM SIGIR International Conference on Theory of Information Retrieval, Sep. 23, 2019, 4 Pages.
Sharma, et al., "Conceptual Captions: A Cleaned, Hypernymed, Image Alt-text Dataset for Automatic Image Captioning", in Proceedings of the 56th Annual Meeting of the Association for Computational Linguistics, vol. 1, Jul. 15, 2018, pp. 2556-2565.
Vedantam, et al., "CIDER: Consensus-based Image Description Evaluation", in Proceedings of IEEE Conference on Computer Vision and Pattern Recognition, Jun. 7, 2015, pp. 4566-4575.
Wang, et al., "Retrieval Enhanced Model for Commonsense Generation", in Proceedings of Findings of the Association for Computational Linguistics, Aug. 1, 2021, pp. 3056-3062.
Wang, et al., "VaTeX: A Large-Scale, High-Quality Multilingual Dataset for Video-and-Language Research", in Proceedings of IEEE/CVF International Conference on Computer Vision, Oct. 27, 2019, pp. 4580-4590.
Williams, et al., "A Broad-Coverage Challenge Corpus for Sentence Understanding through Inference", in Proceedings of the Conference of the North American Chapter of the Association for Computational Linguistics: Human Language Technologies, vol. 1, Jun. 1, 2018, pp. 1112-1122.
Wolf, et al., "HuggingFace's Transformers: State-of-the-art Natural Language Processing", in Repository of arXiv:1910.03771v3, Oct. 16, 2019, 11 Pages.
Xia, et al., "Listwise Approach to Learning to Rank: Theory and Algorithm", in Proceedings of the 25th International Conference on Machine Learning, Jul. 5, 2008, pp. 1192-1199.
Ye, et al., "Sentence Level Machine Translation Evaluation as a Ranking Problem: one step aside from BLEU", in Proceedings of the Second Workshop on Statistical Machine Translation, Jun. 2007, pp. 240-247.

\* cited by examiner

DENSE RETRIEVAL EMPLOYING PROGRESSIVE DISTILLATION TRAINING

BACKGROUND

Computer-based search and retrieval is now employed to assist with a range of tasks including automated open-domain question answering, retrieval and display of additional content related to content already being viewed by a user, or retrieval of documents related to a user-specified query.

Computer-based search and retrieval technologies are well-suited to performing search and retrieval functions over large sets of data. Computer-based search and retrieval technologies that rely on heuristics can struggle to identify the most relevant search results in a given search context. Machine-learning models are now commonly employed in various search and retrieval tasks to improve the relevance of search results when the most-relevant results for a given query (and/or, a given user) are not known a priori. However, machine-learning models can suffer from various deficiencies due to the manner in which these models are trained. For instance, a training dataset used to train a machine learning model may not be well-matched to a dataset over which the machine learning model eventually operates. In another example, a machine learning model may be trained according to an objective function that is not well-matched to a task that the machine learning model is intended to perform.

SUMMARY

The following is a brief summary of subject matter that is described in greater detail herein. This summary is not intended to be limiting as to the scope of the claims.

Various technologies pertaining to dense retrieval based upon progressive distillation of metric knowledge from a ranker machine learning model to a retriever machine learning model. In exemplary embodiments, a server computing device is configured to receive a query from a client computing device. The query can be a user-specified query, a query generated by an application executing on the client computing device, or a query generated by the server computing device responsive to receipt of data from the client computing device or responsive to the performance of a particular action by the client computing device.

Responsive to receiving the query, the server computing device identifies search results from a pool of potential results by employing a dense retrieval module that includes a dense retriever and a ranker. Briefly, the dense retriever selects candidate search results from the pool of potential search results. The dense retrieval module provides the candidate search results and the query to the ranker. The ranker computes scores for each of the candidate search results based upon the query, wherein the scores of the candidate search results are indicative of relative ranks of the candidate search results. The dense retrieval module then identifies final search results based upon the scores computed by the ranker. By way of example, and not limitation, the dense retrieval module can identify the final search results as being the candidate search results with the highest rank (e.g., having the highest scores or the lowest scores).

With greater specificity, the dense retriever can include a first encoder that receives the query and computes an embedding of the query. The dense retriever selects the candidate search results from the pool of potential results based upon the embedding of the query and embeddings of the potential results (e.g., which embeddings may be computed by a second encoder included in the dense retriever). For example, the dense retriever can compute a similarity score for a first potential search result in the potential search results based upon the embedding of the query and the embedding of the first potential search result. The dense retriever can include the first potential search results in a group of selected candidate search results based upon the similarity score.

The ranker can include a cross-encoder that is configured to receive as input the query and a first candidate search result (e.g., from among the candidate search results selected by the dense retriever). The cross-encoder receives the query and the first candidate search result and outputs a score pertaining to the first candidate search result. The cross-encoder can further receive the query in combination with each of the remaining candidate search results and computes a respective score for each of the candidate search results. The scores of the candidate search results are indicative of a ranking of the candidate search results relative to one another. The ranker can identify the final search results from among the candidate search results based upon the scores (e.g., returning the highest-ranked results as the identified search results).

The dense retrieval module outputs the identified search results. For instance, in an embodiment wherein the query is a user-specified query, the dense retrieval module can output the identified search results to the client computing device. In other embodiments, the dense retrieval module can output the identified search results to another service being executed by the server computing device, and/or to another computing device (e.g., other than the client computing device and the server computing device) for further processing.

The dense retriever and the ranker of the dense retrieval module can be trained by a process of progressive distillation of knowledge embodied by an evaluation metric from the ranker to the retriever. Pursuant to an example, the dense retriever can be initially "warmed-up" by training the first encoder (configured to compute embeddings for queries) and the second encoder (configured to compute embeddings for potential search results) over a pool of potential search results.

The ranker is trained according to a pre-defined evaluation metric over a training dataset that specifies a target ranking of results relative to a query. In exemplary embodiments, the ranker can be trained according to a target ranking of results rather than evaluation metric scores underlying the target ranking. Stated differently, an objective function used to train the ranker can define a loss in terms of an ordering of items (e.g., scores assigned to candidate search results) rather than the values of the items directly. Training the ranker according to a target ranking rather than scores underlying the ranking can better align the performance of the ranker to a task desirably performed by the ranker rather than a task that is indirectly related to the true task (i.e., determining a ranking of search results rather than computing metric-aligned scores for search results).

In general, the evaluation metric can be any of various metrics that are indicative of a target ranking performance of the ranker. By way of example, and not limitation, the evaluation metric can be an existing standard metric established to evaluate the performance of machine learning models (e.g., the BLEU or ROUGE metrics for evaluation of natural language processing models). In some embodiments, the evaluation metric can be derived from user activity data. In an example, a search engine can maintain statistics indicative of user engagement with various search results returned by the search engine in response to a given query. Such statistics can be indicative of whether and how often users clicked on a search result or did not click on a search result, and/or whether and how often users further engaged with a search result (e.g., made a purchase after clicking on an ad returned as a search result, read a document returned as a search result, clicked on additional links included in a clicked search result, etc.). The evaluation metric can be derived from these statistics by assigning scores to the search results (e.g., relative to a query), which scores implicitly define a ranking among the scored search results.

The "warmed-up" dense retriever is then re-trained based upon output of the trained ranker. Thus, knowledge embodied by the evaluation metric used to train the ranker is progressively distilled from the metric to the ranker, and then from the ranker to the retriever. It has been determined that such a progressive distillation of metric knowledge can yield better performance in returning relevant search results than directly training the dense retriever on the evaluation metric. It is hypothesized that this is due to a limited capacity of the retriever to learn the metric knowledge relative to the ranker, which ranker can be trained to operate over a more limited set of data than the retriever (e.g., a pre-filtered set of candidate search results identified by the dense retriever).

The warmed-up dense retriever is re-trained based upon scores assigned to search results (relative to a query) by the ranker. In a non-limiting example, the warmed-up dense retriever can be re-trained to minimize the Kullback-Leibler (KL) divergence between scores that are determined by the ranker for search results and scores determined by the (warmed-up) dense-retriever for the same search results.

The present technologies facilitate retrieval of more-relevant search results by computing systems than has been achieved by conventional search technologies. Technologies described herein can therefore retain the benefits of computer-based search and retrieval over large datasets while mitigating the disadvantages of potentially lower relevance of search results than could be achieved by a human reviewer.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
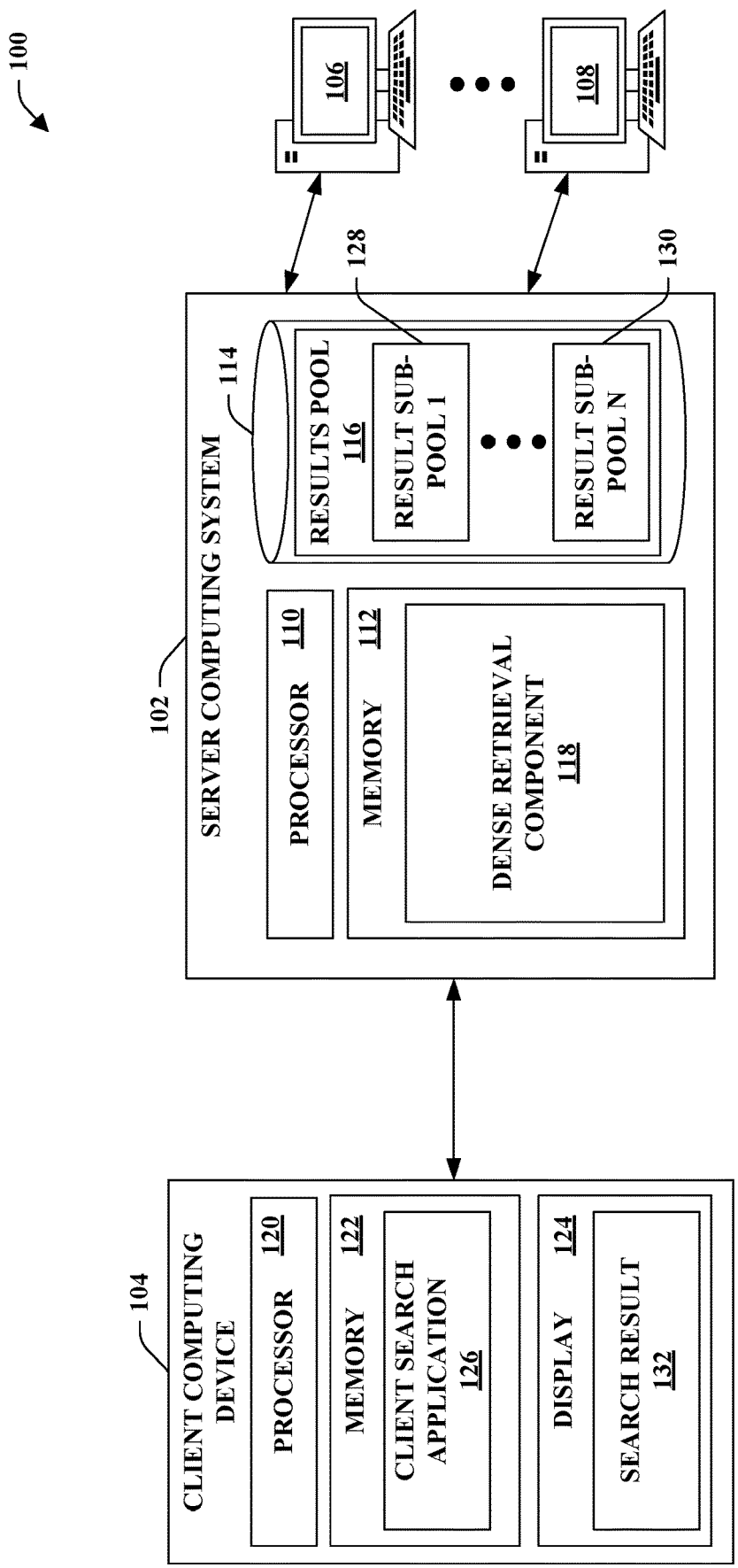
FIG. 1 is a functional block diagram of a computing system that facilitates dense retrieval of search results.

Various technologies pertaining to computerized dense retrieval searching are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "system," and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Technologies described herein facilitate efficient retrieval of relevant results from a large set of potential search results (e.g., a set of billions of potential results). With greater specificity, technologies described herein allow training of machine learning models configured for dense retrieval over inferred relevance information, in the form of an order metric that defines a ranked ordering of search results. Relevance knowledge embodied by the order metric can be distilled from a ranker to a retriever by way of an objective function that is adapted to the task of retrieval of results, rather than ranking of results. Hence, at runtime results can be retrieved quickly while giving weight to the knowledge embodied by the order metric.

Referring now to FIG. 1, an exemplary computing environment 100 that facilitates dense-retrieval-based search is illustrated. The computing environment 100 comprises a server computing system 102, and a plurality of client computing devices 104-108. The client computing devices 104-108 are in network communication with the server computing system 102 (e.g., by way of a local area network or a wide area network such as the Internet). The client computing devices 104-108 provide queries to the server computing system 102. Responsive to receipt of a query, the server computing system 102 identifies one or more search results that are responsive to the query, and outputs the search results to the one of the client computing devices 104-108 that issued the query.

The server computing system 102 includes a processor 110, memory 112 that stores instructions that are executed by the processor 110, and a data store 114 that is operably coupled to the processor 110 and stores various data, including a pool 116 of potential search results.

The client computing devices 104-108 can include a first client computing device 104. The client computing device 104 includes a processor 120, memory 122 that stores instructions that are executed by the processor 120, and a display 124.

The memory 122 includes a client search application 126. The client search application 126 is configured to output a query to the server computing system 102. As indicated above, the server computing system 102 is configured to provide search results to the client computing device 104 responsive to receiving the query output by the client search application 126. The client search application 126 can be or include any of various applications. For example, the client search application 126 can be a web browser, a mobile app, or a backend service for a user-facing application executing on the client computing device 104.

In some embodiments, the client search application 126 is configured to output the query based upon user input. Pursuant to an example, a user of the client computing device 104 can provide text input to the client search application 126, and the client search application 126 can output a query that includes the text to the server computing system 102.

In other exemplary embodiments, the client search application 126 is configured to output the query to the server computing system 102 based upon a computing context of the client computing device 104. Thus, the computing environment 100 can be employed to deliver context-dependent electronic content to the computing devices 104-108. The client search application 126 can generate a query based upon context of the client search application 126 including, but not limited to, user interaction with the client search application 126, automated functionality of the client search application 126, graphical elements displayed on the display 124, data pertaining to a user of the client search application 126, etc. By way of example, and not limitation, the client search application 126 can be a web browser, and the client search application 126 can generate a query that is indicative of content currently displayed in the web browser and/or a characteristic, attribute, or interest of a user of the client search application 126.

Responsive to receiving the query, the dense retrieval component 118 executes a search over the results pool 116 (or, as described in greater detail below, one or more of several candidate result pools 128-130 included in the general results pool 116) to identify results that are relevant to the query. As will be described in greater detail below, the dense retrieval component 118 is configured to employ dense-vector representations of both input queries and potential search results (e.g., included in the results pool 116) to identify a search result that is responsive to the query. The dense retrieval component 118 outputs the identified search result to the client computing device 104. Responsive to the client computing device 104 receiving the search result, the client search application 126 causes the search result to be displayed on the display 124 as search result 132. In a non-limiting example, the search result 132 can be electronic content identified by the dense retrieval component 118 (based upon the query) as being relevant to other content being displayed on the display 124. In a more-specific example, the search result 132 can be electronic content selected by the dense retrieval component 118 to fill a slot for context-dependent electronic content on a web page or within a mobile application.

Figure 2:
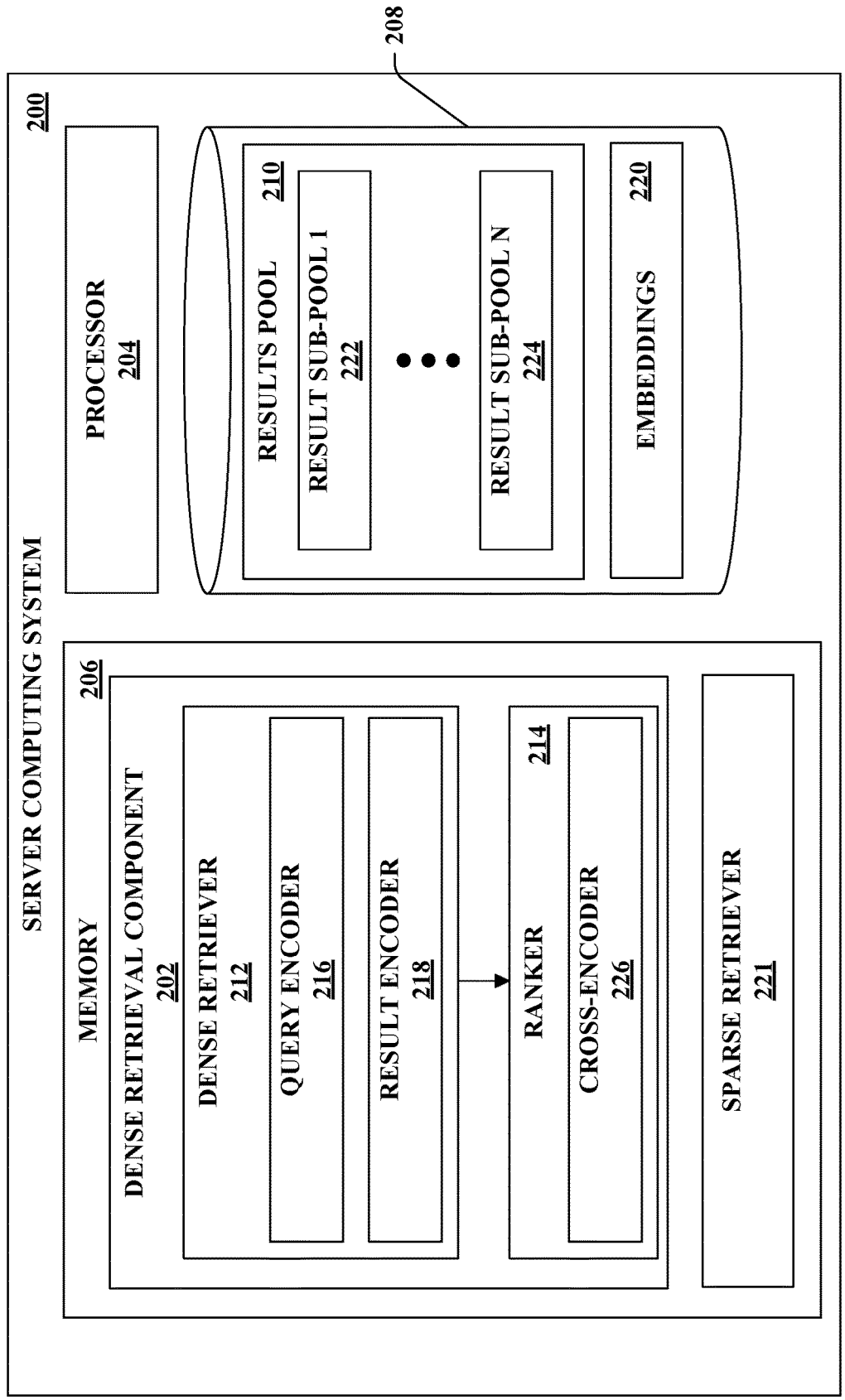
FIG. 2 is a functional block diagram of an exemplary computing system that executes a dense retrieval component.

Referring now to FIG. 2, an exemplary server computing system 200 that employs a dense retrieval component 202 to identify search results is illustrated in greater detail. In exemplary embodiments, the server computing system 200 can be employed as the server computing system 102 in the computing environment 100 illustrated in FIG. 1. The server computing system 200 includes a processor 204, memory 206, and a datastore 208 that stores a pool 210 of potential search results. The memory 206 includes the dense retrieval component 202. The dense retrieval component 202 is configured to identify search results pertaining to a query received by the server computing system 200 based upon dense vector representations of the query and search results in the results pool 210.

The dense retrieval component 202 includes a dense retriever 212 and a ranker 214. The dense retriever 212 is configured to identify, based upon a query received by the server computing system 200, a set of candidate results from among the potential search results in the results pool 210. The ranker 214 is configured to rank the candidate results identified by the dense retriever 212. The dense retrieval component 202 can be configured to output one or more of the ranked candidate results as search results for the query based upon ranks assigned to the candidate results by the ranker 214.

The dense retriever 212 includes a query encoder 216. The query encoder 216 is a machine learning model that is configured to encode the query in a dense-vector embedding. Responsive to receiving the query, the server computing system 200 provides an input vector representation of the query, q to the query encoder 216. In exemplary embodiments, the input vector q can be an encoded representation of text included in the query (e.g., an encoded representation of text set forth by a user and received as the query. In some embodiments, q can include query rewrites, encoded user data, feature values indicative of a computing context of a computing device that originated the query, etc. Responsive to receiving the input vector, the query encoder 216 outputs an embedding of the query $E_q(q)$. In an exemplary embodiment, the query encoder is a BERT-based machine-learning model.

The dense retriever 212 can further include a result encoder 218. The result encoder 218 is configured to receive an input vector r that represents a potential search result in the results pool 210, and to output a dense-vector embedding representation, $E_r(r)$, of the potential search result. The dense retriever 212 can be configured to generate embeddings of potential search results in the results pool 210 by way of the result encoder 218 prior to runtime (e.g., prior to the receipt of a query by the server computing system 200). The server computing system 200 can thus store the embeddings of the potential search results $E_r$ in the datastore 208 as embeddings 220 prior to receipt of a query.

The dense retriever 212 is configured to select candidate search results from the pool of potential search results 210 based upon the embedding of the query $E_q(q)$ and the embeddings of the potential results $E_r$. The dense retriever 212 assigns similarity scores to potential results in the results pool 210. Pursuant to an example, the dense retriever 212 can assign similarity scores to each of the potential results in the results pool 210.

In other examples, the dense retriever 212 can be configured to assign similarity scores to only a subset of the potential results in the results pool 210. For instance, the dense retrieval component can further include a sparse retriever 221 (e.g., that identifies potential search results according to any of various techniques) that is configured to identify a subset of the potential results 210 based upon the query received by the server computing system 200. In some embodiments, the dense retrieval component 202 can be configured to assign similarity scores only to the subset of the potential results 210 identified by the sparse retriever 221.

In other embodiments, the results pool 210 can include a plurality of sub-pools 222-224. The sub-pools 222-224 can each include a plurality of potential results in the results pool 210. The results in each of the sub-pools 222-224 can include labels indicating to which of the sub-pools the results belong. It is to be appreciated that some potential search results may belong to more than one of the sub-pools 222-224 or none of the sub-pools 222-224. The sub-pools 222-224 of the search results can be assigned according to any of various characteristics or attributes of the potential search results. In a non-limiting example, a first sub-pool of search results can be webpage results, a second sub-pool of search results can be video results, and a third sub-pool of search results can be image results. In another example, a first sub-pool of search results can be search results generally related to a first topic (e.g., sports), a second sub-pool of search results can be search results generally related to a second topic (e.g., news), and a third sub-pool of search results can be search results generally related to a third topic (e.g., shopping). In still another example, the sub-pools 222-224 can be search results sorted according to a frequency of user interaction with the results when returned as search results responsive to queries. Illustrating further, a first sub-pool can be search results that yield user interaction with a first frequency (e.g., most-frequently clicked when returned), a second sub-pool can be search results that yield user interaction with a second frequency less than the first frequency, and a third sub-pool can be search results that yield user interaction with a third frequency that is less than the second frequency.

In various of the foregoing examples, the dense retriever 212 can be configured to assign similarity scores to results in one of the sub-pools 222-224 of results based upon the query. For instance, the query can include an indication that the query seeks image search results. In such example, the dense retriever 212 can be configured to assign similarity scores to an image results sub-pool in the sub-pools 222-224 and not to a webpage results sub-pool in the sub-pools 222-224. In yet another example, the dense retrieval component 202 can be configured to identify a general topic to which the query pertains (e.g., sports, news, shopping, etc.) prior to the dense retriever 212 assigning the similarity scores. The dense retriever can then assign similarity scores to results in one of the sub-pools of results 222-224 that includes results corresponding to the topic identified by the dense retrieval component 202.

The dense retriever 212 can compute the similarity scores of potential results (e.g., all results in the results pool 210, or any subset of the results in the pool 210 such as but not limited to the sub-pools 222-224) vis a vis the query based upon a dot product of their respective embeddings with the embedding of the query. In other words, the dense retriever 212 can compute the similarity score of a potential result with embedding $E_r(r)$ according to:

$$sim(q,r) = E_q(q)^T E_r(r) \qquad \text{Eq. 1}$$

It is to be appreciated that the query encoder 216 and the result encoder 218 are configured to output embeddings $E_q$ and $E_r$, respectively, rather than similarity scores sim(q,r). As will be described in greater detail below, the query encoder 216 can be jointly trained with the result encoder 218 based upon a contrastive loss function that is based upon similarity scores sim(q, r) rather than directly on the embeddings $E_q$ and $E_r$.

The dense retriever 212 selects candidate search results from among the results for which the dense retriever 212 computed similarity scores with respect to the query. In an exemplary embodiment, the dense retriever 212 can select as candidate search results a pre-defined number of results having highest similarity scores (or lowest, depending on configuration of a loss function used to train the query encoder 216 and the result encoder 218). For example, the dense retriever 212 can select as candidate search results those results with the 1,000 highest similarity scores, the 500 highest similarity scores, or the 100 highest similarity scores. In other embodiments, the dense retriever 212 can select as candidate search results those results whose similarity scores exceed some threshold value. In such embodiments, the threshold value can be a pre-defined threshold value or can be a threshold value that is determined based upon the similarity scores of the results (e.g., based upon a mean or median value of the similarity scores, or a clustering of the similarity scores).

The dense retriever 212 provides the selected candidate search results to the ranker 214. The ranker 214 is configured to generate a ranking of the candidate search results selected by the dense retriever 212. Thus, the dense retriever 212 identifies a subset of the potential search results in the search results pool 210 as being candidate search results, whereas the ranker 214 generates a ranking of the previously-identified subset of candidate search results.

The ranker 214 includes a cross-encoder 226 that is configured to receive both the query (e.g., as a feature vector representation of the query) and a candidate search result (e.g., as a feature vector representation of a candidate search result selected by the dense retriever 212). Responsive to receiving the query and the candidate search result, the cross-encoder 226 outputs a score that is indicative of a ranking of the candidate search result with respect to other candidate search results. In contrast with the dense retriever 212, which computes scores for candidate search results based upon distinct embeddings of the query and candidate search results (output by the query encoder 216 and result encoder 218, respectively), the cross-encoder 226 is configured to jointly encode the query and a candidate search result to a single value. Thus, whereas a similarity score for a result may be computed by the dense retriever 212 according to Eq. 1, a similarity score sim'(q, r) for a query q and a candidate result r can be output by the cross-encoder 226 directly.

The ranker 214 can generate a ranking of the candidate search results based upon the score output by the cross-encoder 226. For example, a score generated by the cross-encoder for a candidate search result can be compared to a score generated by the cross-encoder 226 for another candidate search result in order to identify a ranking of the two candidate search results relative to one another (vis-à-vis the query). It is to be understood that feature vector representations of the query and search results provided as input to the ranker 214 may be the same or different than feature vector representations of the same query and search results that are provided as input to query encoder 216 and result encoder 218.

The ranker 214 can be configured to provide, to the cross-encoder 226, each of the candidate search results identified by the dense retriever 212. The cross-encoder 226 receives each of the candidate search results in combination with the query, and outputs a respective score for each of the candidate search results. Pursuant to an example, the cross-encoder 226 receives the query and a first candidate search result and outputs a first score pertaining to the first candidate search result. Continuing the example, the cross-encoder 226 receives the query and a second candidate search result and outputs a second score pertaining to the second candidate search result. Thus, the ranker 214 causes the cross-encoder 226 to generate scores for each of the candidate search results.

Collectively, the scores for the candidate search results are indicative of a ranking of the candidate search results relative to one another. For example, a candidate search result with the highest score among the scores can be a highest-ranked search result, a candidate search result with the second-highest score among the scores can be a second-highest-ranked search result, and so on. In other embodiments, scores and ranks can be inversely related. In other words, in such embodiments a candidate search result with the highest score can be a lowest-ranked search result.

The ranker 214 receives the scores generated by the cross-encoder 226 and outputs a ranked list of search results. The dense retrieval component 202 can cause the ranked list of search results to be output to a service or device that originated the query to which the search results pertain. For example, if the query originated from another service (e.g., an application or other program) executing on the server computing system 200, the dense retrieval component 202 can provide that service with the ranked list of search results. In another example, if the query originated from another computing device (e.g., one of the client computing devices 104-108), the dense retrieval component 202 can cause the server computing device 200 to output the ranked list of search results to that computing device.

It is to be understood that the ranked list of search results returned by the dense retrieval component 202 can be a subset of the candidate search results identified by the dense retriever 212. In other words, although the ranker 214 may be configured to generate a ranking of all of the candidate search results provided to the ranker 214 by the dense retriever 212, the dense retrieval component 202 need not return an indication of the complete ranking to the originator of the query. In some instances, for example, the dense retrieval component 202 can return a single search result (e.g., from among the candidate search results identified by the dense retriever 212 and ranked by the ranker 214) based upon that search result having a higher rank than any other search results. In another example, the dense retrieval component 202 can return a single search result based upon that search result having a score, generated by the cross-encoder 226, that is a threshold greater than the score of any other candidate search result scored by the cross-encoder 226.

Figure 3:
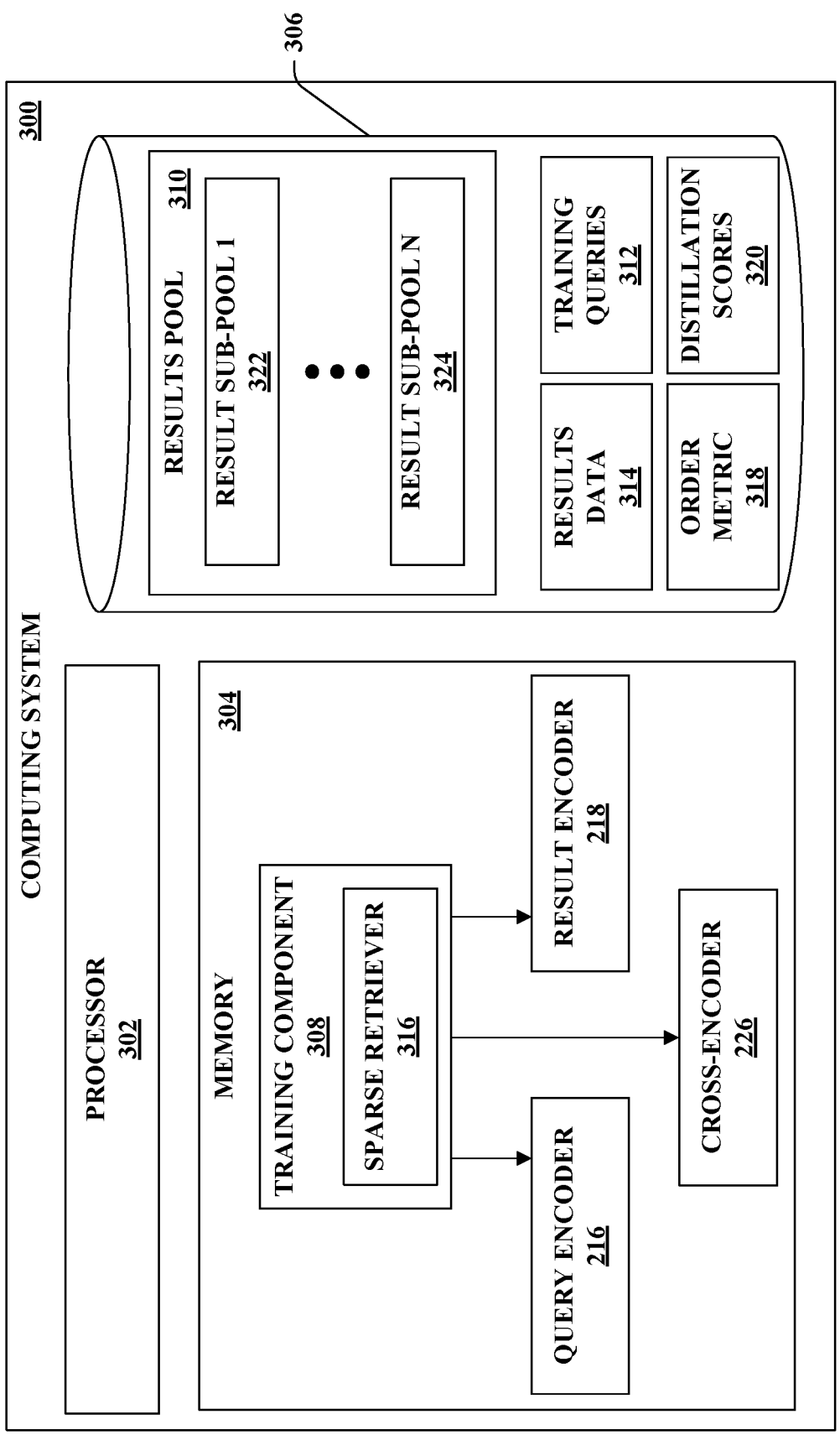
FIG. 3 is a functional block diagram of an exemplary computing system that is configured to train machine learning models employed by a dense retrieval component.

Various details pertaining to configuration and training of the dense retriever 212 and the ranker 214 are now described. Referring now to FIG. 3, another exemplary computing system 300 is illustrated. The computing system 300 includes a processor 302, memory 304, and a datastore 306. The memory 304 includes a training component 308, the query encoder 216, the result encoder 218, and the cross-encoder 226. The training component 308 is configured to train the encoders 216, 218, and 226. With greater specificity, the training component 308 is configured to train the encoders 216, 218, 226 based upon progressive distillation of a ranking evaluation metric from the cross-encoder 226 (which functions as a component of the ranker 214) to the query encoder 216 and the result encoder 218 (which function as components of the dense retriever 212).

The training component 308 begins by performing a first-pass training of the query encoder 216 and the result encoder 218, referred to herein as a "warm-up" phase or "warming up" the encoders 216, 218. In the warm-up phase, the training component 308 jointly trains the query encoder 216 and the result encoder 218 based upon a contrastive loss function:

$$L(q; r_1, r_2, \ldots, r_i) \quad \text{Eq. 2}$$
$$= -\log \frac{\exp(\text{sim}(q, r_1))}{\exp(\text{sim}(q, r_1)) + \sum_{i=1}^{N} \exp(\text{sim}(q, r_i))}$$

where $\text{sim}(q, r)$ is defined as in Eq. 1 above, $r_1$ is a positive result relative to the query q, $r_2$ is a hard negative result, and $r_i$ is an i-th negative result, where results are drawn from a results pool 310 stored in the datastore 306. The results pool 310 can be the results pool 210 over which the encoders 216, 218, 226 will operate at runtime, the results pool 310 can include some, but not all, of the results in the results pool 210, or the results pool 310 can be entirely distinct from the results pool 210.

The loss function defined by Eq. 2 is defined in terms of the similarity score function $\text{sim}(q, r)$, which is in turn defined by the embeddings $E_q$ and $E_r$, output by the query encoder 216 and the result encoder 218, respectively. Thus, the training component 308 jointly trains the query encoder 216 and the result encoder 218 based upon the loss function. In an exemplary embodiment, the training component 308 performs backpropagation based upon the loss function of Eq. 2 through each of the query encoder 216 and the result encoder 218.

In various exemplary embodiments, the datastore 306 can further store training queries 312 and results data 314. The training queries 312 comprise queries with respect to which the encoders 216, 218, 226 will be trained. The results data 314 can indicate which results in the result pool 310 are considered positive, hard negative, or negative results for each query in the training queries 312.

The results data 314 can take different forms and can be obtained in different ways depending on an intended final use of the dense retrieval component 202. In an exemplary embodiment, the dense retrieval component 202 can be configured to select related electronic content, such as advertisements, for presentment alongside other electronic content being viewed on a client device. In such an embodiment, the results data 314 can include click data that is indicative of whether and how (e.g., click, no click, or click in addition to further user engagement such as purchase) a user interacted with electronic content. Based upon the click data, the training component 308 can label different results as being positive results, hard negative results, or negative results with respect to a query. For example, the training component 308 can label a result in the result pool 310 as a positive result based upon that result being indicated by the results data 314 as having resulted in a click with additional user engagement when returned in response to a query (e.g., user context).

As used herein, a hard negative result refers to a result that does not necessarily satisfy a query (i.e., is a negative result relative to the query), but that is similar in one or more ways to positive results that do satisfy the query. As an example, a picture of a cardinal might be a hard negative with respect to a query "pictures of robins," whereas a picture of a robin would be a positive result and a picture of a couch would be a negative result or "easy" negative result. In various embodiments, the training component 308 can include a sparse retriever 316 that is configured to retrieve a pool of candidate hard negative results based upon a training query in the training queries 312. In an exemplary embodiment, the sparse retriever 316 can be configured to retrieve, from the results pool 310, results that include one or more features in common with a query (e.g., results that include the word "dog" where the query includes the word "dog" or results that are labeled as pertaining to a demographic category where the representation of the query includes a feature value indicating that a user belongs to the demographic category). The candidate hard negative results retrieved by the sparse retriever 316 can then be employed by the training component 308 as hard negative results with respect to the training query when warming up the query encoder 216 and the result encoder 218. In some embodiments, the set of results $\{r_1, r_2, \ldots, r_i\}$ employed to warm up the query encoder 216 and the result encoder 218 can be composed of the positive result $r_1$ and the remainder of the results $r_2, \ldots, r_i$ can consist of hard negative results (e.g., as selected by the sparse retriever).

It is to be appreciated that any of various loss functions can be employed by the training component 308 in connection with warming up the query encoder 216 and the result encoder 218. In general, the training component 308 can employ a loss function that tends to cause the encoders 216, 218 to output embeddings (i.e., $E_q$ and $E_r$) that yield high similarity scores (e.g., as computed according to Eq. 1) for results that are known or believed to be highly relevant to a given query, and low similarity scores for results that are known or believed not to be highly relevant to that query.

The training component 308 trains the cross-encoder 226 to learn an order metric that indicates a target order of results in response to a query. In other words, the training component 308 trains the cross-encoder 226 such that the cross-encoder 226 outputs high scores for results that are highly ranked according to the order metric, and outputs low scores for results that are low-ranked according to the order metric.

In some embodiments, the order metric can be a pre-defined, user-specified order metric. Such a pre-defined order metric can be stored in the data store as order metric 318. The pre-defined order metric 318 can indicate, for one or more training queries in the training queries 312, a ranked order of search results in the results pool 310. For instance, the pre-defined order metric 318 can be defined over the set of search results $\{r_1, r_2, \ldots, r_i\}$ referenced in Eq. 2 above (and relative to a query, q) as:

$$M(q,r_1) > M(q,r_2) > \ldots > M(q,r_i) \qquad \text{Eq. 3}$$

where M(q, r) is a metric score of a result r with respect to the query q. Thus, the order metric of Eq. 3 defines a ranked order of the results in the set $\{r_1, r_2, \ldots, r_i\}$. It is to be appreciated that the order metric 318 need not be defined over every result in the results pool 310 for every query in the training queries 312, as there may be many results in the results pool 310 that are not relevant to every query in the training queries 312.

In other embodiments, the order metric can be derived from the results data 314. As indicated above, the results data 314 can indicate which results in the results pool 310 are positive or negative results pertaining to queries in the training queries 312. In various embodiments, the results data 314 can include data from which a relative ordering of the results in the pool 310 can be inferred. By way of example, and not limitation, the results data 314 can include the click data referenced above. The training component 308 can derive an order metric of results in the results pool 310 based upon the click data. For instance, if the click data indicates that a first result has a higher click rate (e.g., a higher number of clicks per view) than a second result, the training component 308 can derive an order metric that gives the first result a higher ranking than the second result.

In another exemplary embodiment, the results data 314 can include viewership data that indicates various viewership statistics for video results. The viewership data can include, for example, a start rate for various video results (i.e., a number of users who started watching a video relative to a number of users who viewed a link to a video), an average watched duration of video results (e.g., expressed as a percent of the total duration of the video results), a completion rate for video results (i.e., a fraction of viewers of the video results who watched an associated video to completion), or the like. In such embodiments, the training component 308 can derive the order metric 318 relative to video results in the results pool 310 based upon the viewership data. By way of example, and not limitation, the training component 308 can define the order metric 318 such that a first video result that has a highest start rate is ranked above a second video result that has a lower start rate than the first video result. It is to be appreciated that the order metric 318 can be defined over video results based upon a plurality of factors indicated by or derivable from the viewership data.

It is further to be understood that the present disclosure is not limited by the exemplary order metrics described above, and that an order metric over a set of results in the results pool 310 can be derived or inferred from any of various data pertaining to search results. The training component 308 can store the derived order metric as order metric 318. In other embodiments, the training component 308 can retain the derived order metric in memory 304 for use during training the cross-encoder 226.

The training component 308 trains the cross-encoder 226 over the training queries 312 and results from the results pool 310 based upon the order metric 318 (or other order metric derived from the results data 314). The training component 308 trains the cross-encoder 226 such that similarity scores output by the cross-encoder 226 sim'(q, r) match the order defined by the order metric. Stated differently, the cross-encoder 226 is trained such that when the similarity scores of the results $\{r_1, r_2, \ldots, r_i\}$ are ranked highest to lowest, the order of the results is the same as defined by the order metric (e.g., according to Eq. 3). Thus, for the order metric defined according to Eq. 3, the cross-encoder 226 is trained to generate similarity scores that satisfy:

$$sim'(q,r_1) > sim'(q,r_2) > \ldots > sim'(q,r_i) \qquad \text{Eq. 4}$$

In an exemplary embodiment, the training component 308 can be configured to train the cross-encoder 226 based upon ListMLE loss:

$$z = [sim'(q, r_1), sim'(q, r_2), \ldots, sim'(q, r_i)] \qquad \text{Eq. 5}$$

$$L_{ListMLE} = -\log \prod_{k=1}^{i} \frac{e^{(z_{o_k})}}{\sum_{j=k}^{i} e^{(z_{o_j})}} \qquad \text{Eq. 6}$$

where $o_i$ is the order of the ith result in $\{r_1, r_2, \ldots, r_i\}$ as defined by the order metric 318 (e.g., according to Eq. 3). Thus, the training component 308 is configured to train the cross-encoder 226 to learn the order of the results $\{r_1, r_2, \ldots, r_i\}$ as defined by the order metric 318 rather than specific scores for each of the results.

It is to be appreciated that the set of results (drawn from the results pool 310) over which the training component 308 trains the cross-encoder 226 may be the same or different than the set of results over which the training component 308 trains the query encoder 216 and the result encoder 218. In various embodiments, the training component 308 can select a set of results from the results pool 310 with which to train the cross-encoder 226 based upon output of the warmed-up query encoder 216 and result encoder 218. By way of an example, the training component 308 can compute similarity scores for results in the results pool 310 based upon an embedding of a training query output by the warmed-up query encoder 216 and embeddings of the results in the results pool 310 output by the warmed-up result encoder 218. The training component 308 can then select a subset of the results in the results pool 310 based upon the computed similarity scores. The training component 308 can be configured to train the cross-encoder 226 over the selected subset of the results. Thus, the warmed-up query encoder 216 and the warmed-up result encoder 218 can be employed to select a subset of the results 310 that may be expected to be more relevant to the training query than results drawn at random from the results pool 310.

After the cross-encoder 226 is trained according to the order defined by the order metric 318, the training component 308 re-trains the query encoder 216 and the result encoder 218 based upon output of the trained cross-encoder 226. Once the cross-encoder 226 is trained, the training component 308 can use the cross-encoder 226 to generate similarity scores sim'(q, r) for each of the results to which the order metric 318 pertains. While the same notation sim'(q, r) is used herein for similarity scores output by the cross-encoder 226 during training and subsequent to training, it is to be understood that retraining of the query encoder 216 and the result encoder 218 is performed by the training component 308 based upon similarity scores output by the cross-encoder 226 after the cross-encoder 226 has been trained. The (post-training) similarity scores sim'(q, r) output by the cross-encoder 226 can be stored as distillation scores 320.

The training component 308 trains the query encoder 216 and the result encoder 218 based upon the distillation scores 320. Thus, the training component 308 effectively "distills" knowledge embodied by the order metric 312 from the cross-encoder 226 to the query encoder 216 and the result encoder 218. It has been empirically observed that distillation of the knowledge embodied by the order metric 312 from the cross-encoder 226 to the query encoder 216 and the result encoder 218 causes the dense retrieval component 202 (the output of which is determined by the query encoder 216 and the result encoder 218) to retrieve more relevant search results from the results pool 210 than if the query encoder 216 and the result encoder 218 were trained directly on the order metric 312 itself. It is hypothesized that a relevance order of potential search results relative to a query is complex, but the learning ability of the query encoder 216 and the result encoder 218 through the jointly-generated similarity scores sim(q, r) is limited. By contrast, the cross-encoder 226 may have a greater data-fitting ability.

In an exemplary embodiment, the training component 308 trains the query encoder 216 and the result encoder 218 based upon the Kullback-Leibler divergence according to:

$$z=[sim'(q,r_1), sim'(q,r_2), \ldots, sim'(q,r_i)] \quad \text{Eq. 5}$$

$$l=[sim(q,r_1), sim(q,r_2), \ldots, sim(q,r_i)] \quad \text{Eq. 7}$$

$$L_{KL}=KL(z\|l) \quad \text{Eq. 8}$$

By way of example, and not limitation, the training component 308 can be configured to train the query encoder 216 and the result encoder 218 to minimize the loss $L_{KL}$ by minimizing the Kullback-Leibler divergence $KL(z\|l)$. As indicated above, the training component 308 jointly trains the query encoder 216 and the result encoder 218, as the similarity scores sim(q, r) are defined in terms of the embeddings output by the query encoder 216 and the result encoder 218, according to Eq. 1. Subsequent to the training component 308 re-training the query encoder 216 and the result encoder 218, the query encoder 216, the result encoder 218, and the cross-encoder 226 can be employed in the dense retriever 212 and the ranker 214 to facilitate dense retrieval of results by the dense retrieval component 202.

It is to be appreciated that different instantiations of the encoders 216, 218, 226 may be trained differently to facilitate performing different search tasks. For example, one instantiation of the encoders 216, 218, 226 can be configured to facilitate retrieval of electronic content of a first type (e.g., text) that pertains to a query. Continuing the example, a different instantiation of the encoders 216, 218, 226 can be configured to facilitate retrieval of electronic content of a second type (e.g., images or video) that pertains to the query. Thus, referring once again to FIG. 2, while a single instantiation of the query encoder 216, result encoder 218, and cross-encoder 226 is shown, it is to be understood that the dense retrieval component 202 can include additional instantiations of such components, where each instantiation is configured to facilitate retrieval of electronic content of a different type.

Furthermore, the result sub-pools 222-224 can be pools of different types of electronic content, such that each instantiation of the encoders 216, 218, 226 operates over a distinct sub-pool of the results 210. In a specific, non-limiting example, the first sub-pool 222 can consist of webpage results and the Nth sub-pool 224 can consist of image results. A first instantiation of the encoders 216, 218, 226 can be trained to generate embeddings/similarity scores with respect to webpage results and can be configured to operate over the first sub-pool 222 of the results 210. A second instantiation of the encoders 216, 218, 226 can be trained to generate embeddings/similarity scores with respect to image results and can be configured to operate over the Nth sub-pool 224 of the results 210. Accordingly, and referring briefly once again to FIG. 3, the results pool 310 employed by the computing system 300 can include a plurality of result sub-pools 322-324, wherein each of the sub-pools 322-324 represents a different type of potential search results. In such embodiments, the training component 308 can be configured to train an instantiation of each of the query encoder 216, the result encoder 218, and the cross-encoder 226 based upon a selected sub-pool or sub-pools from among the sub-pools 322-324. It is to be appreciated, however, that in some embodiments the encoders 216, 218, 226 can be trained in a manner that is agnostic to the type of electronic content desirably returned, such that the same instantiation of the encoders 216, 218, 226 can operate over all of the results in the results pool 210.

As indicated above, the results data 314 may also be formatted differently for different search tasks. Similarly, the order metric 318, when derived by the training component 308 from the results data 314, may be different when training the encoders 216, 218, 226 for different search tasks. For example, if the training component 308 is training the encoders 216, 218, 226 for use in connection with searching over webpage or image results, the training component 308 can derive an order metric that is based upon click rates or engagement rates (e.g., rates of further interaction subsequent to a click with respect to webpage or image content). In another example, if the training component 308 is training the encoders 216, 218, 226 for use in connection with searching over video results, the training component 308 can derive an order metric that is based upon number of views, duration of views, or the like. In general, an order metric employed by the training component 308 is indicative of a ranking of relevance of results in the results pool 310 relative to one or more queries.

Figure 4:
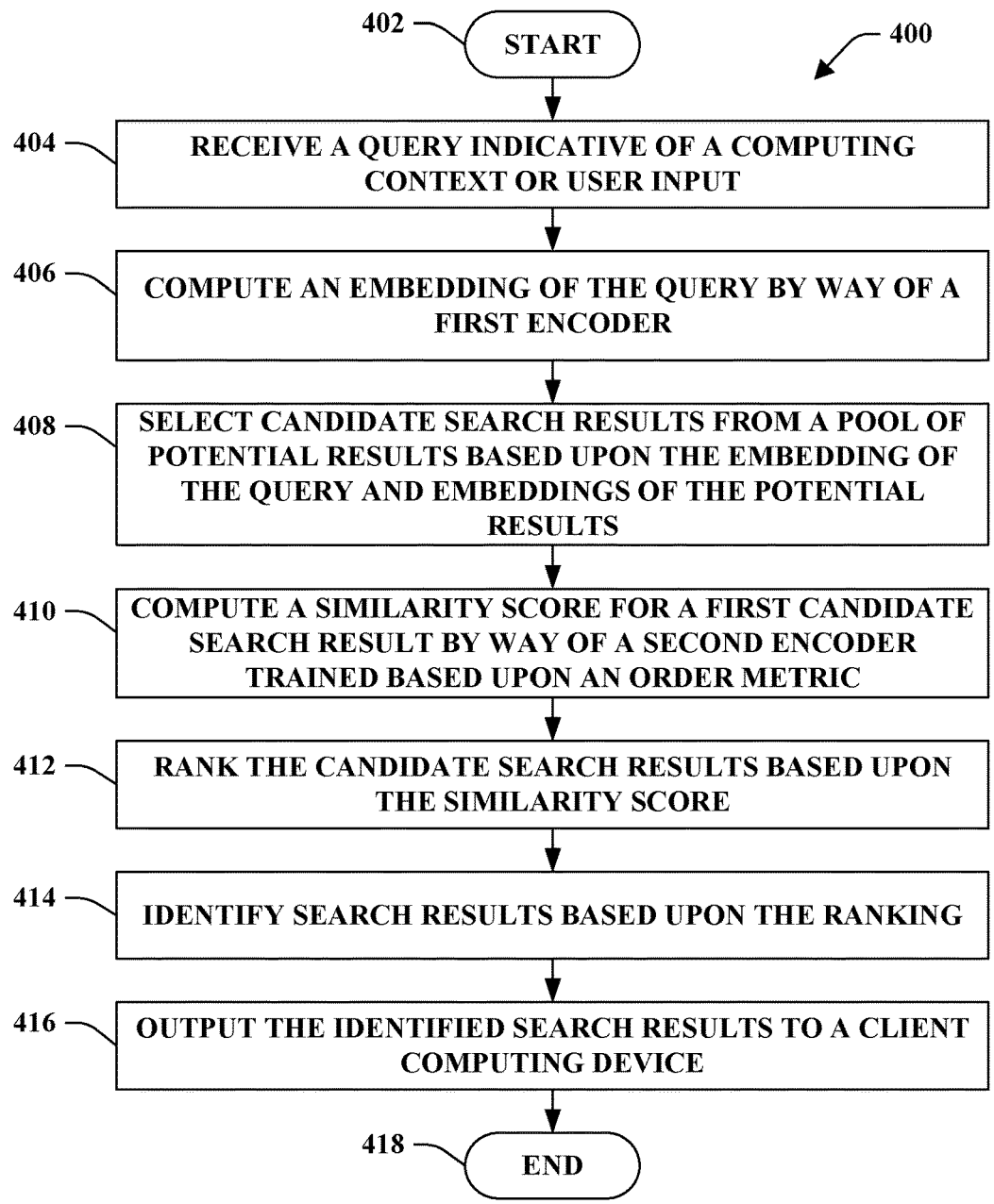
FIG. 4 is a flow diagram illustrating a method for identifying search results by way of a dense retrieval system.
Figure 5:
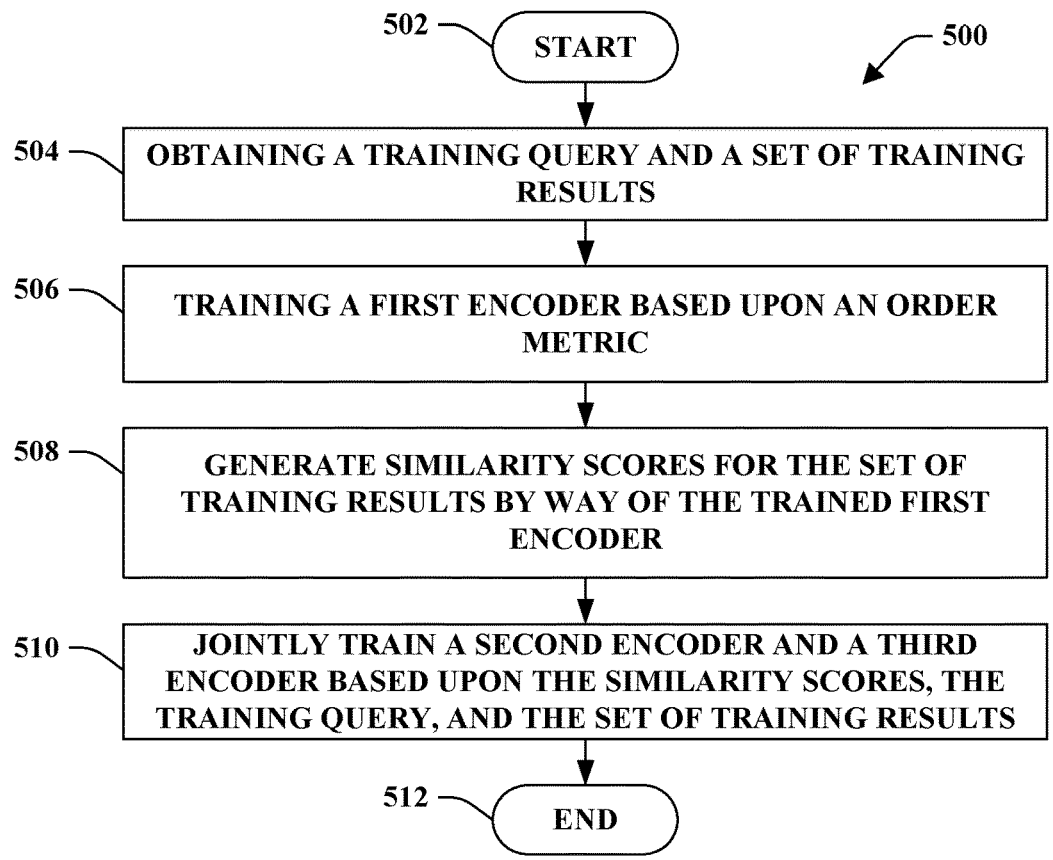
FIG. 5 is a flow diagram illustrating a method for training a dense retrieval system.

FIGS. 4 and 5 illustrate exemplary methodologies relating to a dense retrieval system for identifying results that are relevant to a query. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring solely to FIG. 4, a method 400 that facilitates retrieving search results by way of a dense retrieval system is illustrated. The method 400 begins at 402 and at 404 a query that is indicative of a computing context of a client computing device or user input set forth by way of the client computing device is received. As indicated above, a computing context indicated by such a query can include data pertaining to content that was displayed on the client computing device at the time the query was generated, data indicative of a characteristic or attribute of a user, data relating to one or more applications executing on the client computing device, or the like.

Responsive to receipt of the query at 404, search results that are responsive to the query are identified from a pool of potential results. At 406, an embedding of the query is computed by way of a first encoder, which is alternately referred to here as a query encoder. The first encoder is configured to receive a first vectorized representation of the query and to output the embedding of the query, wherein the embedding is a dense vector representation of the query.

At 408, candidate search results are selected from the pool of potential results based upon the embedding of the query computed at 406 and embeddings of the potential results. The candidate search results are a subset of the pool of potential results. The embeddings of the potential results can be computed by way of a results encoder prior to runtime (e.g., prior to receipt of the query at 404). However, it is to be understood that the embeddings of the potential results could be computed by the results encoder at runtime (e.g., responsive to receipt of the query at 404). In various embodiments, the results encoder is jointly trained with the query encoder (e.g., as described above with respect to FIG. 3).

At 410, a similarity score is computed for a first candidate search result in the candidate search results by way of a second encoder, alternately referred to herein as a cross-encoder. The second encoder can be configured to receive a vector representation of the query (which may be the same or different than the vector representation of the query provided to the query encoder) and a vector representation of the first candidate search result, and to output the similarity score responsive to receive those vector representations. The second encoder is trained based upon an order metric that is indicative of a ranked ordering of a set of training results relative to one or more training queries. The training results can be included in the pool of potential results from which the candidate search results are drawn, or the training results can be results that are not included in the pool of potential results. In some embodiments, the ranked ordering defined by the order metric can be specified by a developer or other entity. In other embodiments, the ranked ordering defined by the order metric can be derived from some other data, such as click data or viewership data, that is indicative of some ranking of the training results relative to the one or more training queries.

Furthermore, the first (query) encoder is trained based upon output of the second encoder. Thus, while the second encoder (or cross-encoder) is trained according to a loss function that is directly based upon the order metric, the first (query) encoder is trained based upon a progressive distillation of the order metric knowledge through the similarity scores output by the second encoder. In an exemplary embodiment, the first, query encoder and the third, results encoder can be jointly trained based upon a Kullback-Leibler divergence between similarity scores output by the second encoder and similarity scores derived from embeddings output by the first and third encoders.

At 412, the candidate search results selected at 408 are ranked based upon the similarity score for the first candidate search result output by the second encoder at 410. For example, the first candidate search result can be ranked higher than a second candidate search result based upon the similarity score of the first candidate search result being higher than a similarity score of the second candidate search result (e.g., as generated by the second encoder).

At 414, search results are identified based upon the ranking of the candidate search results. In an exemplary embodiment, a highest ranked search result can be identified as a search result to be returned responsive to the query. In other embodiments, a threshold number of highest-ranked candidate search results can be identified as search results to be returned responsive to the query.

At 416, the identified search results are output to a client computing device (e.g., a client computing device to which the computing context pertains or from which the user input was received at 404). The method 400 ends at 418.

Referring now solely to FIG. 5, another exemplary method 500 that relates to training a dense retrieval system is illustrated. The method 500 begins at 502, and at 504 a training query and a set of training results are obtained. The training results can be or be included in a set of results over which a dense retrieval system is desirably operated, or the training results can be a distinct set of results. At 506, a first encoder is trained based upon an order metric that is indicative of a ranked ordering of the training results relative to the training query. At 508, subsequent to the first encoder being trained based upon the order metric, similarity scores are generated for the training results by way of the trained first encoder. The similarity scores are indicative of a ranking of the training results. For example, a training result with a highest similarity score among the similarity scores generated at 508 can be considered a highest-ranked training result. In an exemplary embodiment, the first encoder is trained at 506 such that the ranking of the training results indicated by the similarity scores matches the ranking defined by the order metric. For instance, the similarity score of a highest-ranked training result according to the order metric can be a highest similarity score among the similarity scores generated at 508.

At 510, a second encoder (e.g., a query encoder) and a third encoder (e.g., a result encoder) are jointly trained based upon the similarity scores output by the first encoder at 508, the training query, and the set of training results. By way of example, and not limitation, the second encoder can receive the query and output a query embedding, and the third encoder can receive a training result from the set of training results and output a result embedding. Continuing the example, a similarity score for the training result relative to the query can be computed based upon the query embedding and the result embedding. The second encoder and the third encoder can be trained to minimize a Kullback-Leibler divergence between similarity scores for results output by the first encoder (at 508) and similarity scores for results derived from output of the second and third encoders (e.g., as described above with respect to FIG. 3 and Eqs. 5, 7, and 8). Thus, knowledge embodied by the order metric is progressively distilled from the first encoder to the second and third encoders by way of the training at 510. Subsequent to training the second and third encoders at 510, the various encoders can be employed in a dense retrieval system that executes searches over a pool of potential results. For example, the first encoder can be employed as the cross-encoder 226, the second encoder can be employed as the query encoder 216, and the third encoder can be employed as the result encoder 218.

Figure 6:
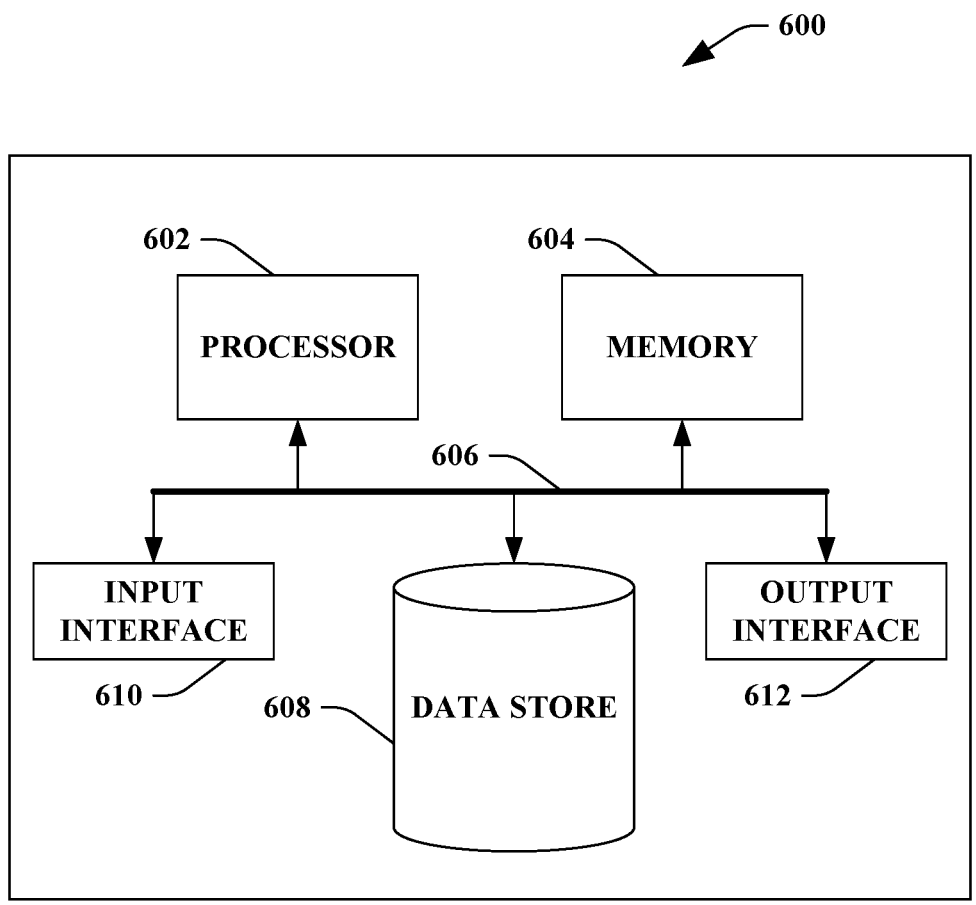
FIG. 6 depicts a computing device.

Referring now to FIG. 6, a high-level illustration of an exemplary computing device 600 that can be used in accordance with the systems and methodologies disclosed herein is illustrated. For instance, the computing device 600 may be used in a dense retrieval system, where the computing device 600 can be configured to execute a dense retrieval component for identifying search results from a potential pool of search results. By way of another example, the computing device 600 can be used in a system that is configured to train a dense retrieval component (e.g., by training various encoders included in the dense retrieval component). The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store queries, potential search results, etc.

The computing device 600 additionally includes a data store 608 that is accessible by the processor 602 by way of the system bus 606. The data store 608 may include executable instructions, a pool of potential search results, training queries, results data (e.g., viewership data, click data, etc.), training results, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
a processor; and
memory that stores instructions that, when executed by the processor, cause the processor to perform acts comprising:
responsive to receiving a query from a client computing device, computing an embedding of the query by way of a first encoder;
selecting candidate search results from a pool of potential results based upon the embedding of the query and embeddings of the potential results, the candidate search results being a subset of the potential results;
computing a similarity score for a first candidate search result in the candidate search results by way of a second encoder, wherein the second encoder receives the query and the first candidate search result as input, wherein the second encoder is trained based upon an order metric that is indicative of an ordering of the potential results, and wherein the first encoder is trained based upon output of the second encoder;
ranking the candidate search results based upon the similarity score;
identifying a search result pertaining to the query based upon the ranking of the candidate search results; and
outputting the identified search result to the client computing device.

2. The computing system of claim 1, further comprising a data store, the acts further comprising:
computing the embeddings of the potential results by way of a third encoder, the third encoder trained based upon output of the second encoder; and
storing the embeddings of the potential results in the data store.

3. The computing system of claim 2, the acts further comprising:
warming up the first encoder and the third encoder;
training the second encoder based upon the order metric and output of the warmed-up first encoder and the warmed-up third encoder; and
re-training the first encoder and the third encoder based upon output of the trained second encoder.

4. The computing system of claim 1, wherein selecting the candidate search results comprises:
computing a similarity score for a first potential result in the potential results based upon the embedding of the query and an embedding of the first potential result; and
selecting the first potential result as one of the candidate search results based upon the similarity score for the first potential result.

5. The computing system of claim 4, wherein the similarity score for the first potential result is a dot product of the embedding of the query and the embedding of the first potential result.

6. The computing system of claim 1, wherein the query is indicative of at least one of:
electronic content being displayed at the client computing device; or
a characteristic, attribute, or interest of a user of the client computing device.

7. The computing system of claim 1, wherein the order metric is based upon at least one of click data or viewership data with respect to the potential results.

8. A method comprising:
receiving a query that is indicative of at least one of a computing context of a client computing device or user input set forth by way of the client computing device;
identifying search results from a pool of potential results by performing acts comprising:
computing an embedding of the query by way of a first encoder;
selecting candidate search results from the pool of potential results based upon the embedding of the query and embeddings of the potential results, the candidate search results being a subset of the potential results;
computing a similarity score for a first candidate search result in the candidate search results by way of a second encoder, wherein the second encoder that receives the query and the first candidate result as input, wherein the second encoder is trained based upon an order metric, and wherein the first encoder is trained based upon output of the second encoder;
ranking the candidate search results based upon the similarity score; and
identifying the search results based upon the ranking of the candidate search results; and
outputting the identified search results to the client computing device.

9. The method of claim 8, further comprising:
training the second encoder based upon the order metric; and
training the first encoder based upon a first set of similarity scores output by the second encoder relative to a training query.

10. The method of claim 9, wherein training the second encoder is based upon a ListMLE loss function.

11. The method of claim 9, wherein the embeddings of the potential results are generated by way of a third encoder, wherein the first encoder and the third encoder are jointly trained.

12. The method of claim 11, wherein training the first encoder is further based upon second similarity scores, the second similarity scores being based upon an embedding of the training query output by the first encoder and embeddings of training results output by the third encoder.

13. The method of claim 12, wherein training the first encoder is based upon a Kullback-Leibler divergence between the first similarity scores and the second similarity scores.

14. The method of claim 9, further comprising:
- warming up the first encoder prior to training the second encoder;
- selecting, based upon output of the warmed-up first encoder, a subset of results from a pool of training results; and
- wherein training of the second encoder is based further upon the selected subset of results from the pool of training results.

15. The method of claim 8, wherein the order metric is indicative of a ranked order of training results relative to a training query.

16. The method of claim 15, wherein the training results are included in the pool of potential results.

17. A computer-readable storage medium storing instructions that, when executed by a processor, cause the processor to perform acts comprising:
- receiving a query that is indicative of at least one of a computing context of a client computing device or user input set forth by way of the client computing device;
- retrieving candidate search results from a pool of potential results by way of a dense retriever, wherein retrieving the candidate search results comprises:
  - computing an embedding of the query by way of a first encoder; and
  - retrieving the candidate search results from the pool of potential results based upon the embedding of the query and embeddings of the potential results, the candidate search results being a subset of the potential results;
- ranking the retrieved candidate search results by way of a ranker, wherein ranking the retrieved candidate search results comprises:
  - computing a similarity score for a first candidate search result in the candidate search results by way of a second encoder, wherein the second encoder receives the query and the first candidate result as input, wherein the second encoder is trained based upon an order metric, and wherein the first encoder is trained based upon output of the second encoder; and
  - ranking the candidate search results based upon the similarity score; and
- outputting a search result to the client computing device based upon the ranked candidate search results.

18. The computer-readable storage medium of claim 17, wherein the acts further comprise computing, prior to receipt of the query, embeddings of the potential results by way of a third encoder, the third encoder trained based upon output of the second encoder.

19. The computer-readable storage medium of claim 17, wherein the order metric is indicative of a ranked order of a second pool of potential results relative to a second query.

20. The computer-readable storage medium of claim 17, wherein the dense retriever is trained over a subset of results selected from a pool of training results based upon output of a sparse retriever.

* * * * *